United States Patent
Itou

(10) Patent No.: US 11,733,573 B2
(45) Date of Patent: Aug. 22, 2023

(54) MANUFACTURING METHOD OF A DISPLAY DEVICE COMPRISING A RELAY ELECTRODE ELECTRICALLY CONNECTED TO A SWITCHING ELEMENT VIA A CONTACT HOLE PENETRATING A COLOR FILTER LAYER

(71) Applicant: Japan Display Inc., Tokyo (JP)

(72) Inventor: Osamu Itou, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/583,356

(22) Filed: Jan. 25, 2022

(65) Prior Publication Data
US 2022/0146895 A1 May 12, 2022

Related U.S. Application Data

(63) Continuation of application No. PCT/JP2020/023037, filed on Jun. 11, 2020.

(30) Foreign Application Priority Data

Jul. 31, 2019 (JP) .................................. 2019-141418

(51) Int. Cl.
*G02F 1/1362* (2006.01)

(52) U.S. Cl.
CPC .. *G02F 1/136222* (2021.01); *G02F 1/136209* (2013.01); *G02F 1/136227* (2013.01); *G02F 1/136286* (2013.01)

(58) Field of Classification Search
CPC ................ G02F 1/133792; G02F 1/133357
See application file for complete search history.

(56) References Cited

U.S. PATENT DOCUMENTS

| | | | |
|---|---|---|---|
| 2010/0134397 A1 | 6/2010 | Ishitani et al. | |
| 2015/0049282 A1 | 2/2015 | Kim et al. | |
| 2016/0116797 A1* | 4/2016 | Itou ................... | G02F 1/136227 349/41 |
| 2016/0154273 A1 | 6/2016 | Itou et al. | |
| 2016/0216558 A1 | 7/2016 | Toki et al. | |
| 2016/0299395 A1* | 10/2016 | Kosuge ............. | G02F 1/136209 |

(Continued)

FOREIGN PATENT DOCUMENTS

| CN | 105607368 A | * 5/2016 | ........... G02F 1/1335 |
|---|---|---|---|
| JP | 2000-214483 A | 8/2000 | |

(Continued)

OTHER PUBLICATIONS

International Search Report dated Aug. 25, 2020 in PCT/JP2020/023037 filed on Jun. 11, 2020, 3 pages.

(Continued)

*Primary Examiner* — Paul C Lee
(74) *Attorney, Agent, or Firm* — Maier & Maier, PLLC

(57) ABSTRACT

According to one embodiment, a display device includes a switching element disposed in a display area including a pixel, a color filter layer including a first color filter of a first color and a second color filter of a second color different from the first color and a conductive layer connected to the switching element via a contact hole penetrating the color filter layer. The conductive layer is in contact with the first color filter and the second color filter in the contact hole.

8 Claims, 14 Drawing Sheets

(56) References Cited

U.S. PATENT DOCUMENTS

| | | |
|---|---|---|
| 2017/0023824 A1 | 1/2017 | Kim et al. |
| 2017/0068129 A1* | 3/2017 | Mochizuki ........ G02F 1/133553 |
| 2017/0219877 A1 | 8/2017 | Hwang et al. |
| 2017/0227821 A1* | 8/2017 | Song .................... G02F 1/1362 |

FOREIGN PATENT DOCUMENTS

| | | | |
|---|---|---|---|
| JP | 2000-338525 A | 12/2000 | |
| JP | 2002-350887 A | 12/2002 | |
| JP | 2010-152348 A | 7/2010 | |
| JP | 2015-036817 A | 2/2015 | |
| JP | 2015-137320 A | 7/2015 | |
| JP | 2016-105121 A | 6/2016 | |
| KR | 20180081264 A * | 7/2018 | ............ C07F 7/0834 |

OTHER PUBLICATIONS

Notice of Reasons for Refusal dated Feb. 21, 2023, in corresponding Japanese Patent Application No. 2019-141418, 14 pages.

\* cited by examiner ately. A "connection" as used herein includes not only a case where elements are in direct contact with each other but also a case where elements are connected via another element.

MANUFACTURING METHOD OF A DISPLAY DEVICE COMPRISING A RELAY ELECTRODE ELECTRICALLY CONNECTED TO A SWITCHING ELEMENT VIA A CONTACT HOLE PENETRATING A COLOR FILTER LAYER

CROSS-REFERENCE TO RELATED APPLICATIONS

This application is a Continuation Application of PCT Application No. PCT/JP2020/023037 filed Jun. 11, 2020 and based upon and claiming the benefit of priority from Japanese Patent Application No. 2019-141418, filed Jul. 31, 2019, the entire contents of all of which are incorporated herein by reference.

FIELD

Embodiments described herein relate generally to a display device.

BACKGROUND

As an example of the display devices, liquid crystal display devices comprising a pair of substrates and a liquid crystal layer disposed between these substrates are known. In liquid crystal displays which can perform color display, a color filter layer is provided on one of the pair of substrates. In many cases, the color filter layer is provided on a counter-substrate, which is separate from the array substrate comprising switching elements and pixel electrodes. On the other hand, in some cases, the color filter layer are provided on the array substrate. In order to achieve good display quality in this case, such a layout design is required that the positional relationship between, for example, the contact holes for connecting the switching elements and pixel electrodes to each other and the color filters of different colors contained in the color filter layer are carefully considered.

DETAILED DESCRIPTION

Figure 1:
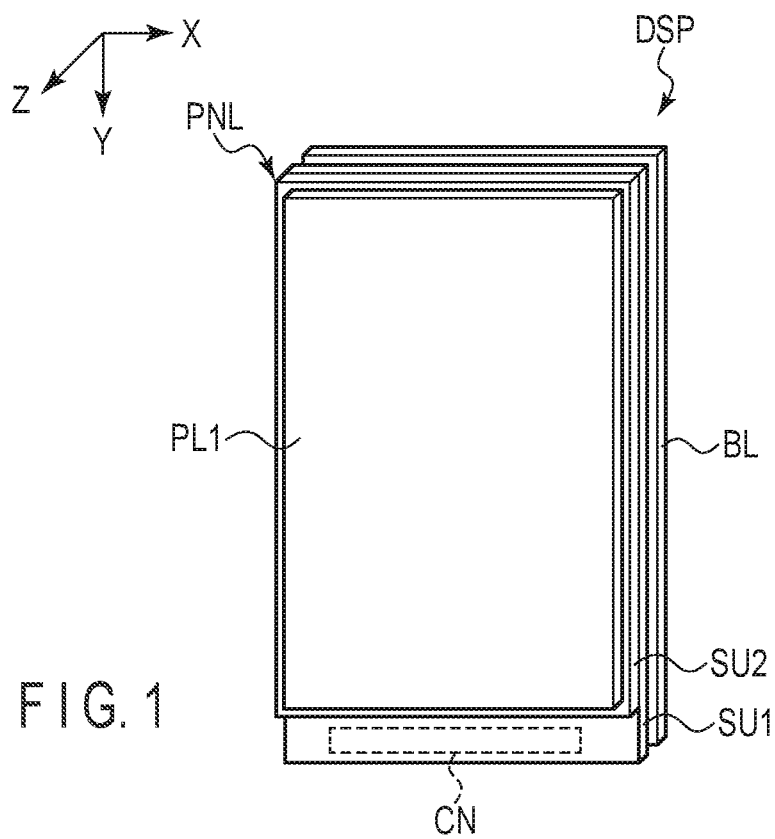
FIG. 1 is a perspective diagram showing an example of the appearance of a display device according to the first embodiment.

In general, according to one embodiment, a display device includes a switching element disposed in a display area including a pixel, a color filter layer including a first color filter of a first color and a second color filter of a second color different from the first color and a conductive layer connected to the switching element via a contact hole penetrating the color filter layer. The conductive layer is in contact with the first color filter and the second color filter in the contact hole.

According to such a configuration, a display device with excellent display quality can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In each embodiment, a transmissive liquid crystal display device is disclosed as an example of the display devices. The liquid crystal display device can be used, for example, in a variety of devices such as a virtual reality (VR) viewer, a smartphone, a tablet terminal, a cell phone terminal, a personal computer, a TV receiver, an in-vehicle device, a game device and a monitor for a digital camera.

Incidentally, each embodiment does not prevent application of individual technical ideas disclosed in each embodiment to other types of display devices comprising color filters. For example, at least part of the configuration disclosed in each embodiment is applicable to a transmissive liquid crystal display device, or a self-luminous display device comprising an organic electroluminescent display element or a micro-LED element, an electronic paper display device comprising an electrophoretic element, a display device to which the micro-electromechanical systems (MEMS) is applied, a display device to which the electrochromism is applied is assumed or the like.

First Embodiment

FIG. 1 is a perspective diagram showing an example of the appearance of a liquid crystal display device DSP (hereinafter referred to as the display device DSP) according to the first embodiment. In this embodiment, X, Y and Z directions are defined as shown in this figure. The X direction, the Y direction and the Z direction are orthogonal to each other, but may intersect at an angle other than being orthogonal. A direction forwarding a tip of an arrow indicating the Z direction may be referred to as "upward" and a direction forwarding oppositely from the tip of the arrow may be referred to as "downward". Viewing the display device DSP and its components parallel to the Z direction may be referred to as planar view.

The display device DSP comprises a display panel PNL, an illumination device BL (backlight), a first polarizer PL1. The display panel PNL, the illumination device BL and the first polarizer PL1 are stacked in the Z direction. Note that, between the display panel PNL and the illumination device BL, a second polarizer PL2 is disposed (see FIG. 4), which will be described later.

The display panel PNL comprises a first substrate SU1 (an array substrate), a second substrate (counter-substrate), and a liquid crystal layer LC (see FIG. 4) disposed between the first substrate SU1 and the second substrate SU2. The first substrate SU1 comprises a connection portion CN. The connection part CN includes terminals for connecting signal supply sources such as a flexible circuit board, IC chips and the like thereto.

For example, the illumination device BL includes a light guide opposing the first substrate SU1, a light source disposed along an end portion of the light guide, and an optical sheet such as a prism sheet or a diffusion sheet, placed between the light guide and the display panel PNL. The light source has a configuration in which, for example, phosphor is stacked on a blue light-emitting diode, and irradiates white light to the light guide. Note that the configuration of the light source is not limited to that of this example.

Figure 2:
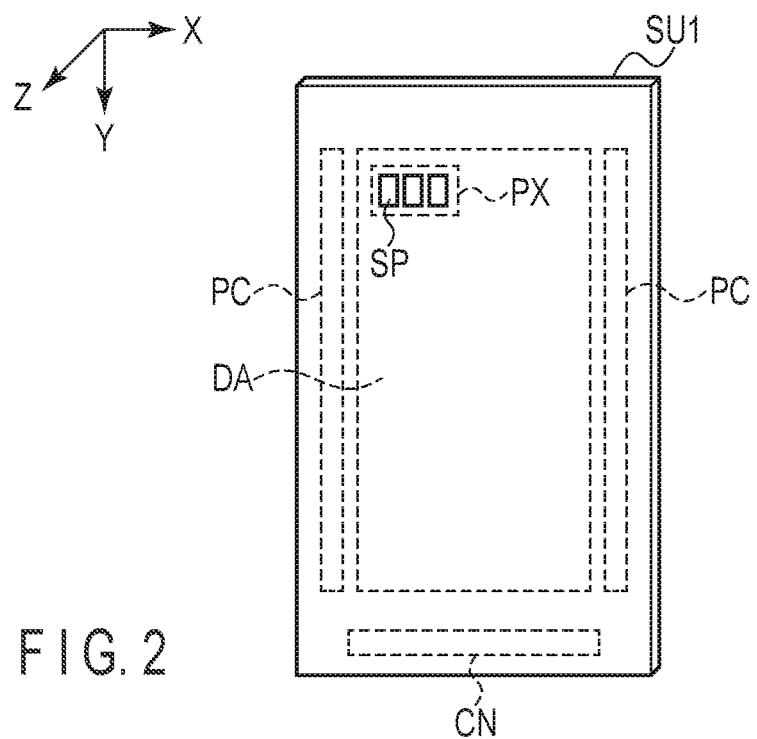
FIG. 2 is a perspective diagram schematically showing an example of a first substrate provided of the display device.

FIG. 2 is a perspective diagram schematically showing an example of the first substrate SU1. The first substrate SU1 comprises a display area DA and a pair of drive circuits PC disposed on an outer side of the display area DA. The display area DA includes a number of pixels PX arranged along the X direction and the Y direction. Each pixel PX includes a plurality of sub-pixels SP that display, for example red, green and blue colors, respectively. The pixel PX may as well include sub-pixels SP displaying some other color such as white. The drive circuit PC supplies signals (scanning signals, which will be described later) for driving the sub-pixels SP.

Figure 3:
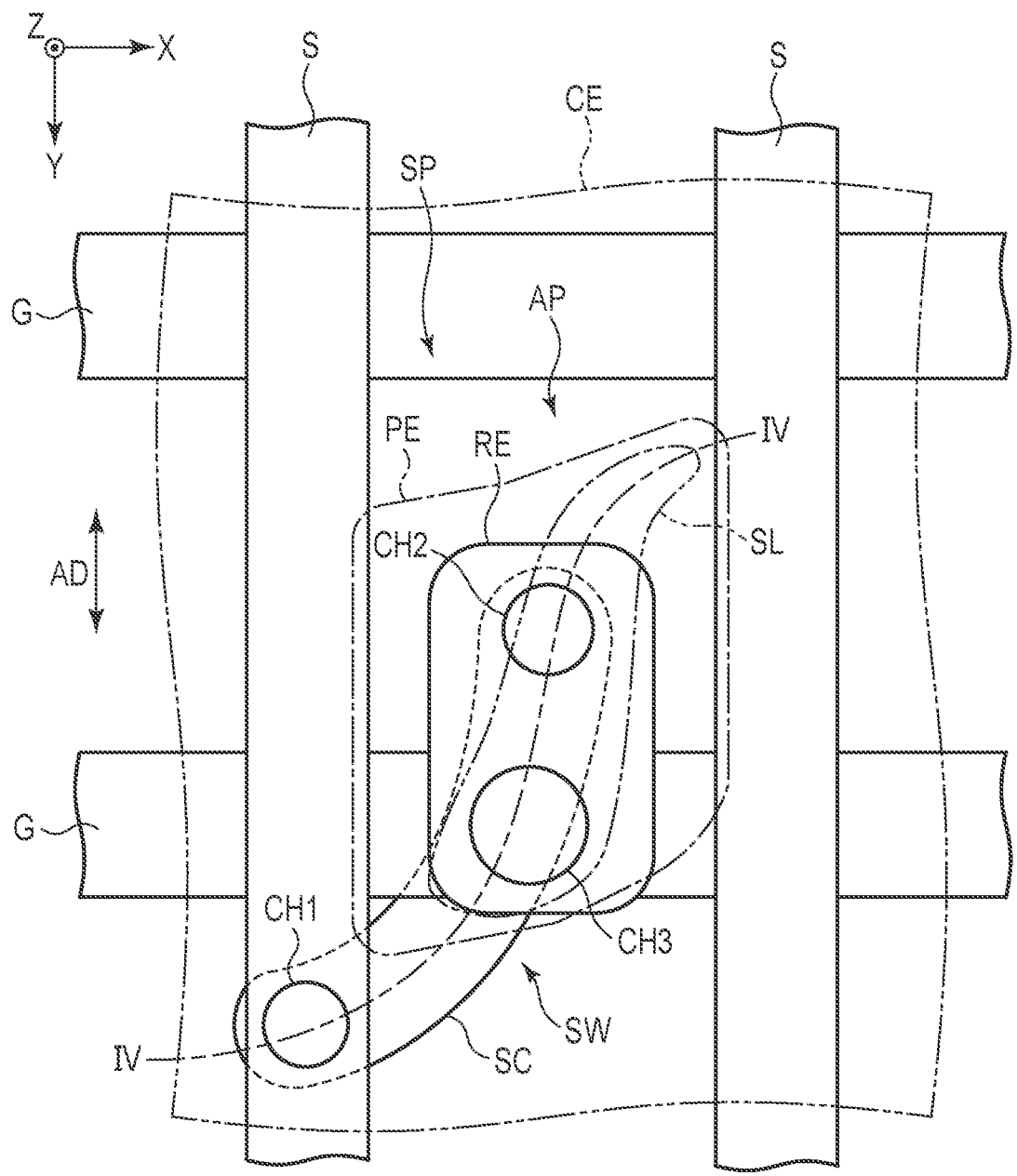
FIG. 3 is a plan view schematically showing an example of a sub-pixel.

FIG. 3 is a plan view schematically showing an example of the sub-pixels SP. The first substrate SU1 comprises a plurality of scanning lines G and a plurality of signal lines S. The scanning lines G extend along the X direction and are aligned along the Y direction. The signal lines S extend along the Y direction and are aligned along the X direction. Each area created by partition with a respective adjacent pair of two scanning lines G and a respective adjacent pair of two signal lines S corresponds to an aperture area AP of one sub-pixel SP.

The first substrate SU1 comprises a pixel electrode PE provided for each sub-pixel SP, a switching element SW and a relay electrode. The switching element SW includes a semiconductor layer SC. The semiconductor layer SC, the relay electrode RE, the pixel electrode PE and a common electrode CE are stacked in this order along the Z direction. In FIG. 3, the pixel electrode PE and the common electrode CE are indicated by chain lines.

The signal line S and the semiconductor layer SC are in contact with each other via a first contact hole CH1. The semiconductor layer SC and the relay electrode RE are in contact with each other via a second contact hole CH2. The relay electrode RE and the pixel electrode PE are in contact with each other via a third contact hole CH3.

Between the first contact hole CH1 and the second contact hole CH2, the semiconductor layer SC bends in an arc shape and intersects the scanning line G once. In the example shown in FIG. 3, the semiconductor layer SC is located below the scanning line G. On the other hand, the relay electrode RE is located above the scanning line G, except for the part located in the second contact hole CH2. The relay electrode RE has, for example, a rectangular shape with rounded corners, and overlaps both the aperture area AP and the scanning line G.

The pixel electrode PE has an area larger than that of the relay electrode RE and overlaps most of the aperture area AP. In the example of FIG. 3, the pixel electrode PE overlaps the scanning line G shown in a lower part of the figure (the scanning line G intersecting the semiconductor layer of the sub-pixel SP), but it does not overlap the scanning line G shown in an upper part of the figure.

The common electrode CE comprises a slit SL in each sub-pixel SP. Note that FIG. 3 illustrates only the slit SL of one sub-pixel SP and slits SL of other sub-pixels SP adjacent to the sub-pixel SP are omitted. At least a part of the slit SL is bent along a diagonal direction of the sub-pixel SP. The slit SL overlaps the pixel electrode PE in its entirety. In the example of FIG. 3, the slit SL overlaps the scanning line G located in the lower part of the figure (the scanning line G intersecting the semiconductor layer of the sub-pixel SP), but it does not overlap the scanning line G shown in the upper part of the figure or the respective signal line S. Further, the slit SL overlaps the second contact hole CH2 and the third contact hole CH3, which will be described later. Further, the slit SL overlaps the semiconductor layer SC between the second contact hole CH2 and the third contact hole CH3.

The second contact hole CH2 is located in the aperture area AP and overlaps the pixel electrode PE and the slit SL. The third contact hole CH3 overlaps the semiconductor layer SC, the respective scanning line G and the slit SL. From another perspective, the third contact hole CH3 overlaps the area where the scanning line G and the semiconductor layer SC intersect each other.

The shapes of the semiconductor layer SC, the relay electrode RE, the pixel electrode PE and the slit SL are not limited to those shown in FIG. 3, but various other shapes can be applied. Further, the positions of the first contact hole CH1, the second contact hole CH2 and the third contact hole CH3 may as well be changed as necessary.

A common voltage is applied to the common electrode CE. When a scanning signal is supplied to the scanning line G, the switching element SW is turned on, and a video signal supplied to the signal line S is applied to the pixel electrode PE via the relay electrode RE. At this time, in the vicinity of the slit SL, an electric field is generated between the pixel electrode PE and the common electrode CE.

When there is no such electric field is being generated, the liquid crystal molecules contained in the liquid crystal layer LC (see FIG. 4) are aligned such that their longitudinal axes are parallel to the initial alignment direction AD. The liquid crystal molecules have, for example, positive dielectric anisotropy, and when the described-above electric field acts on the liquid crystal layer LC, the molecules rotate such that its longitudinal axes face the direction of the electric field. The overlapping portion between the pixel electrode PE and the common electrode CE functions as a storage capacitance to maintain the alignment state of the liquid crystal molecules during the period when the switching element SW is off.

Note that in the example shown in FIG. 3, the initial alignment direction AD is parallel to the Y direction, but the configuration is not limited to that of this example. The liquid crystal layer LC may as well contain liquid crystal molecules with negative dielectric anisotropy.

Figure 4:
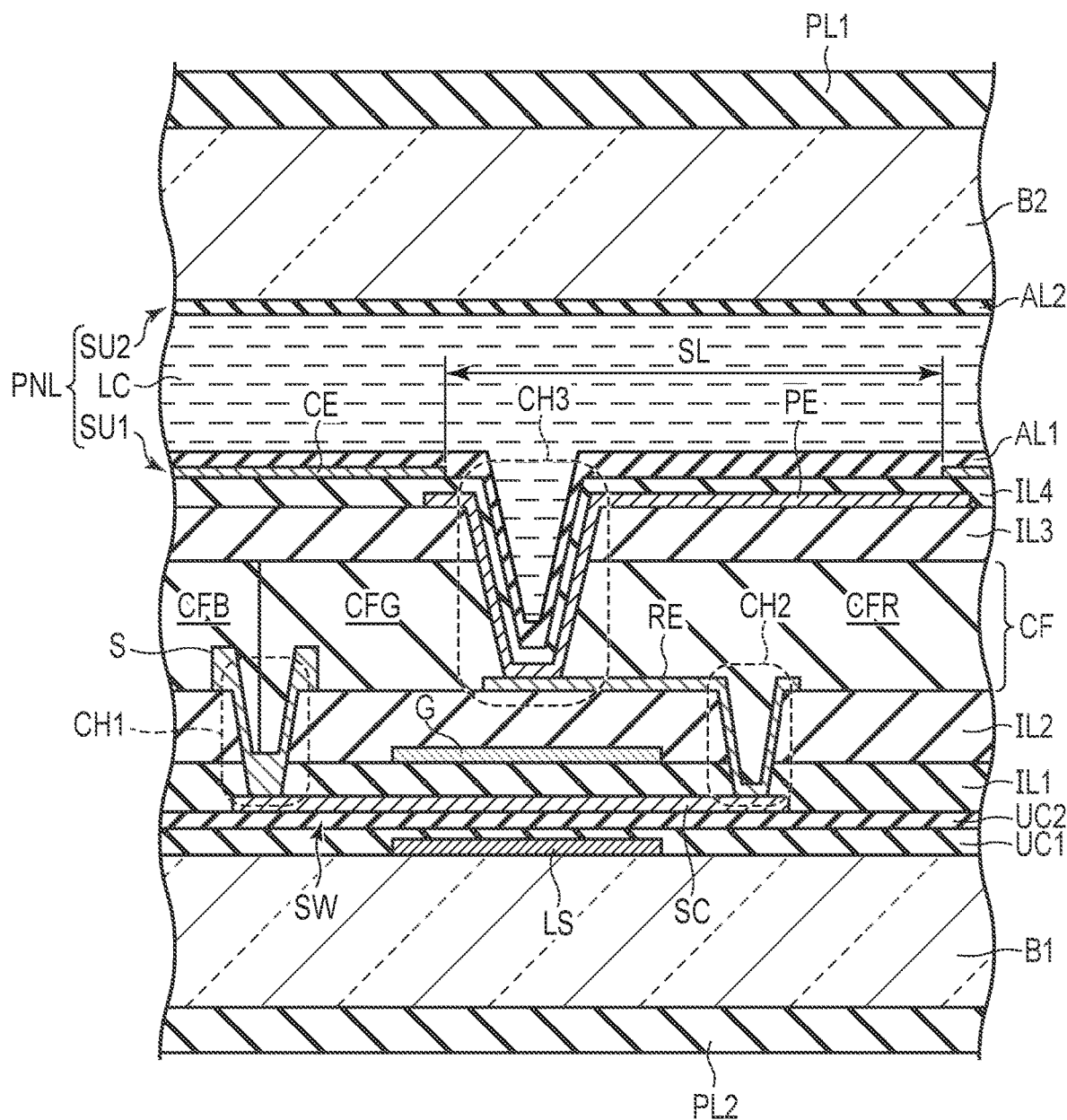
FIG. 4 is a schematic cross-sectional view of a display panel taken along line IV-IV in FIG. 3.

FIG. 4 is a schematic cross-sectional view of the display panel PNL taken along line IV-IV in FIG. 3. As described above, the first substrate SU1 comprises a semiconductor layer SC, scanning lines G, signal lines S, relay electrodes RE, pixel electrodes PE and a common electrode CE. Further, the first substrate SU1 comprises a first base B1, a first undercoat layer UC1, a second undercoat layer UC2, a first insulating layer IL1, a second insulating layer IL2, a second insulating layer IL2, a third insulating layer IL3 (planarization layer), a fourth insulating layer IL4, color filter layers CF, a first alignment film AL1 and a light-shielding layer LS.

The light-shielding layer LS is provided on an upper surface of the first base B1. The first undercoat layer UC1 covers upper surfaces of the light-shielding layer LS and the first base B1. The second undercoat layer UC2 covers the first undercoat layer UC1. The semiconductor layer SC is provided on the second undercoat layer UC2. The area where the semiconductor layer SC and the scanning lines G intersect each other opposes the light-shielding layer LS. The first insulating layer IL1 covers the semiconductor layer SC and the second undercoat layer UC2. The scanning lines G are provided on the first insulating layer IL1. The second insulating layer IL2 covers the scanning lines G and the first insulating layer IL1.

The signal lines S and the relay electrodes RE are provided on the second insulating layer IL2. The color filter layers CF cover the signal lines S, the relay electrodes RE and the second insulating layer IL2, respectively. The third insulating layer IL3 covers the color filter layers CF. The pixel electrodes PE are provided on the third insulating layer IL3. The fourth insulating layer IL4 covers the pixel electrodes PE and the third insulating layer IL3. The common electrode CE is provided on the fourth insulating layer IL4 and extends over multiple sub-pixels SP. The common electrode CE comprises the slit SL described above. The first alignment film AL1 covers the common electrode CE and the fourth insulating layer IL4.

The second substrate SU2 comprises a second base B2 and a second alignment film AL2. The second alignment film AL2 covers a lower surface of the second base B2.

Between the first alignment film AL1 and the second alignment film AL2, the liquid crystal layer described above is disposed. The first polarizer PL1 is disposed on the upper surface of the second base B2. The second polarizer PL2 is disposed on the lower surface of the first base B1. Absorption axes of the first polarizer PL1 and the second polarizer PL2 are orthogonal to each other. For example, the absorption axis of the first polarizer PL1 is parallel to the initial alignment direction AD described above, and in this case, a normally-black display device can be obtained.

The first base B1 and the second base B2 are, for example, made of borosilicate glass with a thickness of 0.2 mm, but they can also be made of a resin such as polyimide. The first alignment film AL1 and the second alignment film AL2 are, for example, polyimide films subjected to an optical alignment treatment, but they may as well be polyimide films subjected to a rubbing alignment treatment. These alignment films AL1 and AL2 align the liquid crystal molecules in the initial alignment direction AD described above.

The first undercoat layer UC1 is, for example, a silicon nitride film. The second undercoat layer UC2 is, for example, a silicon oxide film. The first insulating layer IL1 is, for example, a silicon oxide film. The second insulating layer IL2 is, for example, a silicon nitride film. The fourth insulating layer IL4 is, for example, a silicon nitride film formed at low temperature.

The color filter layers CF include a color filter CFR which overlaps a sub-pixel SP displaying red, a green color filter CFG which overlaps a sub-pixel SP displaying green and a blue color filter CFB which overlaps a sub-pixel SP displaying blue. The red, green and blue colors are examples of the first, second and third colors, respectively. The color filters CFR, CFG and CFB are examples of the first, second and third color filters, respectively.

The color filters CFR, CFG, CFB and the third insulating layer IL3 are formed, for example, of silicon resin. For the color filters CFR, CFG and CFB, for example, negative or positive siloxane resin materials (photoresists) containing red, green and blue pigments, respectively, can be used. For the third insulating layer IL3, a transparent siloxane resin can be used.

The relay electrodes RE, the pixel electrodes PE and the common electrode CE are made, for example, of a transparent conductive material such as indium tin oxide (ITO). The scanning lines G and the light-shielding layers LS are made, for example, of a molybdenum tungsten alloy. The signal lines S have, for example, a three-layer structure in which titanium, aluminum and titanium are stacked in this order. The semiconductor layer SC is, for example, a metal oxide semiconductor containing indium zinc oxide (IZO).

Note that the materials of the elements are not limited to those of the first substrate SU1 and the second substrate SU2 exemplified above, but various kinds of materials can be used for these elements. For example, the semiconductor layer SC may be polysilicon or amorphous silicon.

The first contact hole CH1 and the second contact hole CH2 both penetrate the first insulating layer IL1 and the second insulating layer IL2. The third contact hole CH3 penetrates the color filter layer CF and the third insulating layer IL3. The respective signal line S are in contact with the semiconductor layer SC via the first contact hole CH1. The respective relay electrodes RE is in contact with the semiconductor layer SC via the second contact hole CH2. The respective pixel electrode PE is in contact with the relay electrode RE via the third contact hole CH3.

Thus, in this embodiment, the common electrode CE is placed between the pixel electrode PE and the liquid crystal layer LC along the thickness direction (Z direction) of the first substrate SU1. Further, the color filter layers CF are located between the pixel electrode PE and the relay electrode RE along the thickness direction.

The thicknesses of the color filter layer CF and the third insulating layer IL3 are both greater than the thicknesses of the first insulating layer IL1 and the second insulating layer IL2. Therefore, the third contact hole CH3 is formed to be deeper than the first contact hole CH1 and the second contact hole CH2, and also the diameter thereof in planar view is greater than those.

As described above, the third contact hole CH3 is large, and therefore the surface of the first substrate SU1 (that is, the first alignment film AL1) which is in contact with the liquid crystal layer LC is easily effected to create unevenness thereon. Such an irregular configuration may cause misalignment of the liquid crystal molecules in the vicinity of the third contact hole CH3. However, in this embodiment, the third contact hole CH3 overlaps the light-shielding scanning line G, and therefore the effect by the above-described misalignment on display can be suppressed.

The pixel electrode PE is in contact with the third insulating layer IL3 and the color filter layers CF in the third contact hole CH3. More specifically, the pixel electrode PE is in contact with the color filters of different colors in the third contact hole CH3. In the example of FIG. 4, the pixel electrodes in contact with the color filters CFR and CFG are illustrated, but in the display area DA, there are also pixel electrodes PE in contact with the color filters CFR and CFB and those in contact with the color filter CFG and CFB.

The structure of the display panel PNL is not limited to that of the example shown in FIG. 4. For example, the pixel electrodes PE and the common electrode CE may be disposed in the same layer, or the pixel electrodes PE may be placed between the liquid crystal layer LC and the common electrode CE. The common electrode CE may be placed on the second substrate SU2. The first substrate SU1 or the second substrate SU2 may comprise a light-shielding layer other than those of the scanning lines G and the signal lines S. Further, the display panel PNL can be remodeled into various other forms.

Figure 5:
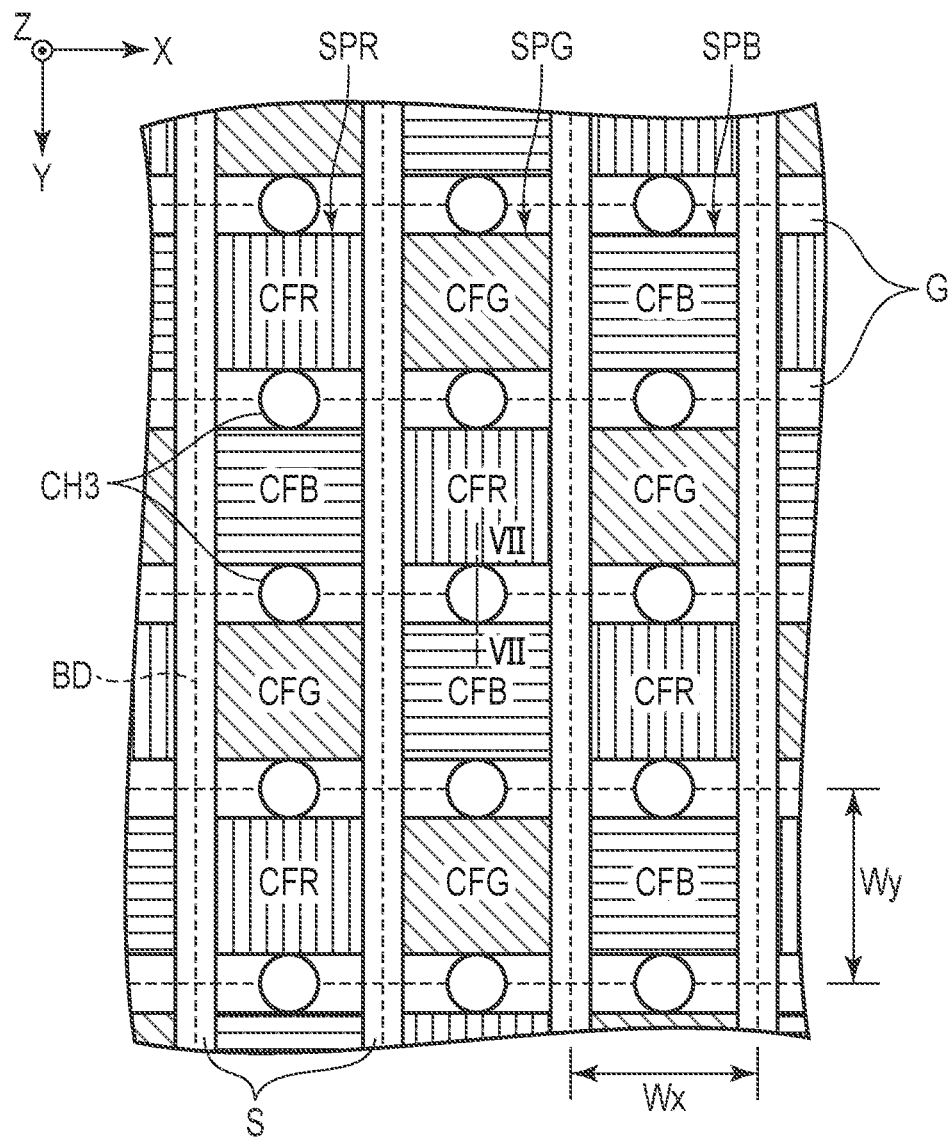
FIG. 5 is a plan view schematically showing an example of arrangement of color filters.

FIG. 5 is a plan view schematically showing an example of arrangement of the color filters CFR, CFG and CFB. In the example shown in this figure, a plurality of sub-pixels SPR in which color filters CFR are disposed, are aligned along a diagonal direction intersecting the X direction and the Y direction. A plurality of sub-pixels SPG in which color filters CFG are disposed and a plurality of sub-pixels SPR in which color filters CFG are disposed, are similarly aligned along the diagonal direction.

From another point of view, along the X direction, the color filters CFR, CFG and CFB are aligned in this order, whereas along the Y direction, the color filters CFR, CFB and CFG are aligned in this order.

The sub-pixels SP (SPR, SPG, SPB) have, for example, the same shape, and the width along the X direction is defined as Wx and the width along the Y direction is defined as Wy. The width Wx is less than the width Wy (Wx<Wy), and for example, the ratio Wx:Wy is 3:4. When high resolution is required, the sub-pixels SP should preferably have a high definition of, for example, 1000 ppi or higher, and more preferably, 2000 ppi or higher. For example, when the above-provided ratio is applied to the sub-pixels SP of 2000 ppi, the width Wx is 6.3 µm and the width Wy is 8.4 µm.

An end portion of each color filter CFR is in contact with end portion of the color filters CFG and CFB of the other colors. Similarly, an end portion of the color filter CFG is in contact with end portions of the color filters CFR and CFB of the other colors, and an end portion of the color filter CFB is in contact with the other end portions of the color filters CFR and CFG of the other colors.

Each boundary BD between color filters of different colors overlap the respective scanning line G and the respective signal line S. The third contact hole CH3 is provided in the boundary BD. That is, the third contact hole CH3 is surrounded by two color filters of different colors without any gaps.

As described above, the alignment of liquid crystal molecules can be disrupted in the vicinity of the third contact hole CH3, it is preferable that the vicinity of the third contact hole CH3 be shielded from light. In the example of FIG. 5, each of the third contact holes CH3 overlaps the respective scanning line G, and therefore it is not necessary to dispose a light-shielding layer to light-shield the third contact hole CH3 in the grid constituted by the scanning lines G and the signal lines S (the aperture area AP in FIG. 3). Thus, it is possible to increase the aperture ratio of each sub-pixel SP.

Further, the color filters CFR, CFG and CFB are dispersed in the X direction and the Y direction, and therefore non-uniformity in display in the X direction and the Y direction cannot be easily recognized by the user's eyes.

Figure 6:
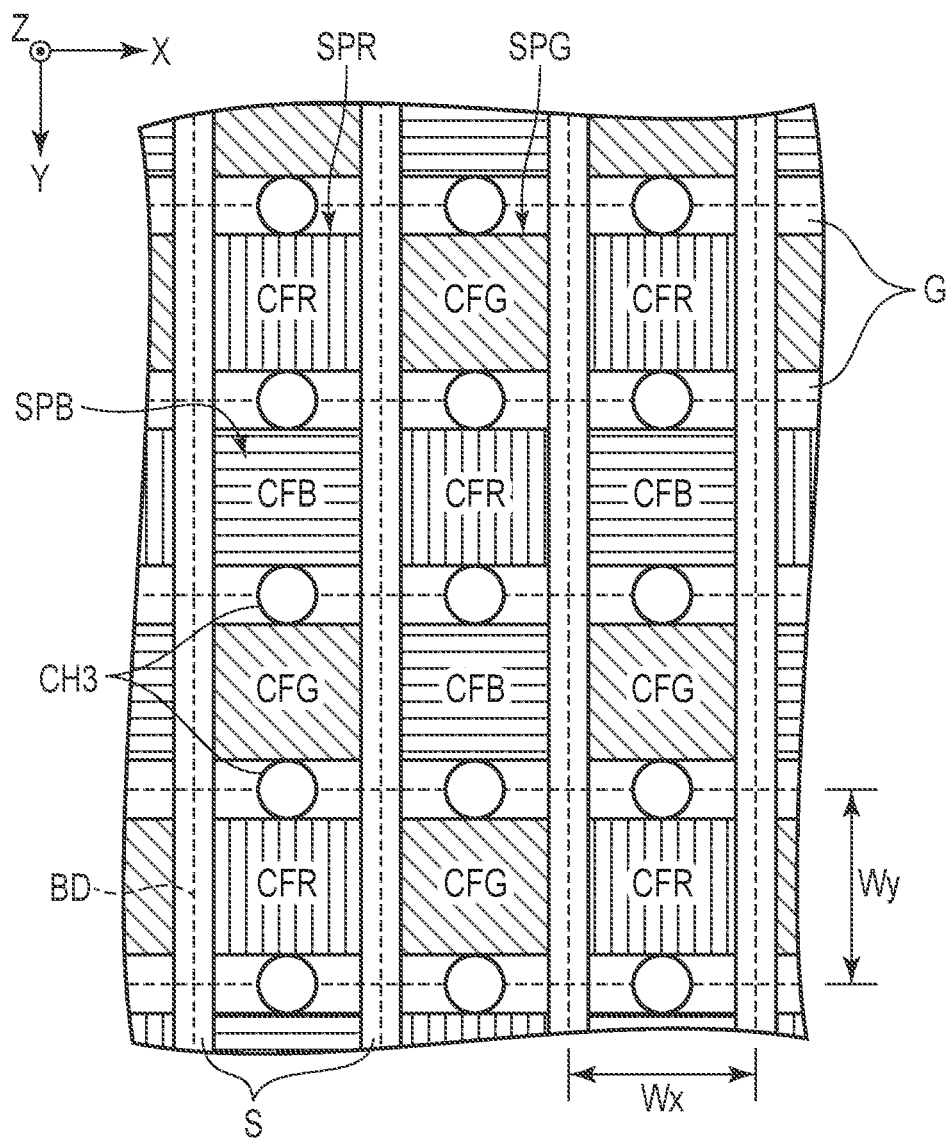
FIG. 6 is a plan view schematically showing another example of the arrangement of the color filters.

FIG. 6 is a plan view schematically showing another arrangement of the color filters CFR, CFG and CFB. In the example illustrated in this figure, a plurality of color filters CFR are aligned along the X direction, while repeating a shift of one sub-pixel upward and a shift of one sub-pixel downward in the figure. The color filters CFG and the color filters CFR are aligned along the X direction while repeating similar shifts.

From another point of view, along the X direction, color filters of one color and color filters of another color are alternately aligned, whereas along the Y direction, color filters CFR, CFB and CFG are aligned in this order.

With such a configuration, the color filters CFR, CFB and CFG are dispersed along the Y direction and the diagonal direction, and therefore non-uniformity in display in the Y direction and the diagonal direction cannot be easily recognized by the user's eyes. Further, the color filters of a particular color are not continuous along the X direction, non-uniformity in display in the X direction can be suppressed to some extent.

The arrangement of the color filters CFR, CFG and CFB can be varied in different ways depending on the usage of the display device DSP. The configuration shown in FIG. 6 is appropriate for, for example, the display of natural images, which do not contain many grating patterns.

Next, an example of the method of manufacturing the display device DSP will be described. FIGS. 7A to 7D are diagrams schematically showing processing steps for forming the third contact hole CH3 in the manufacturing process of the display device DSP. FIGS. 7A to 7D correspond to cross-sectional views showing a part of the first substrate SU1 taken along line VII-VII in FIG. 5.

Figure 7A:
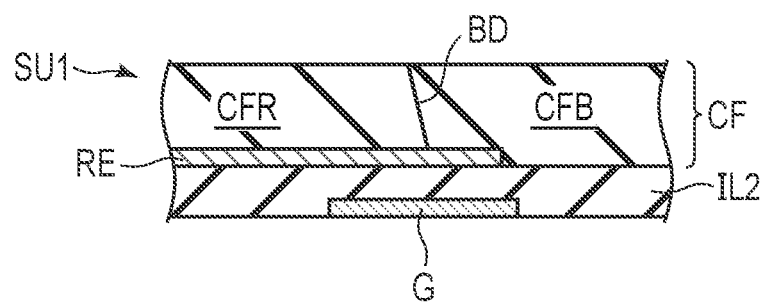
FIG. 7A is a cross-sectional view schematically showing an example of a processing step for forming a contact hole.

First, as shown in FIG. 7A, color filter layers CF is formed on the second insulating layer IL2 and the relay electrode RE. The color filters CFR, CFG and CFB are each patterned by wet etching. For example, it is assumed that the color filter CFG, the color filter CFR and the color filter CFB are formed in this order, but the order is not limited to that of this example.

Figure 7B:
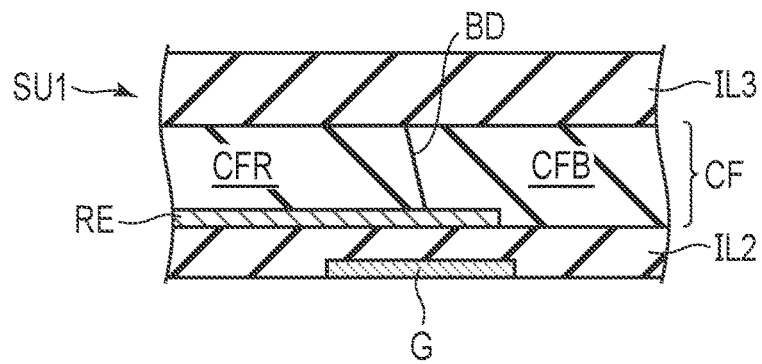
FIG. 7B is a cross-sectional view schematically showing a processing step which follows that of FIG. 7A.
Figure 7C:
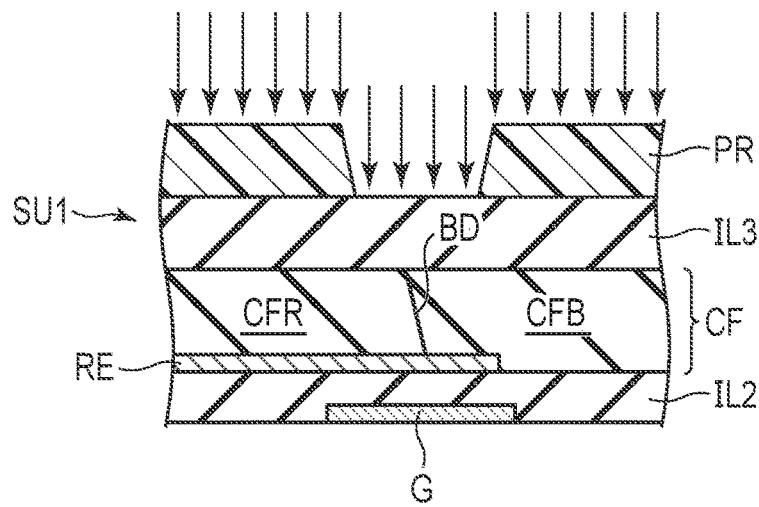
FIG. 7C is a cross-sectional view schematically showing a processing step which follows that of FIG. 7B.
Figure 7D:
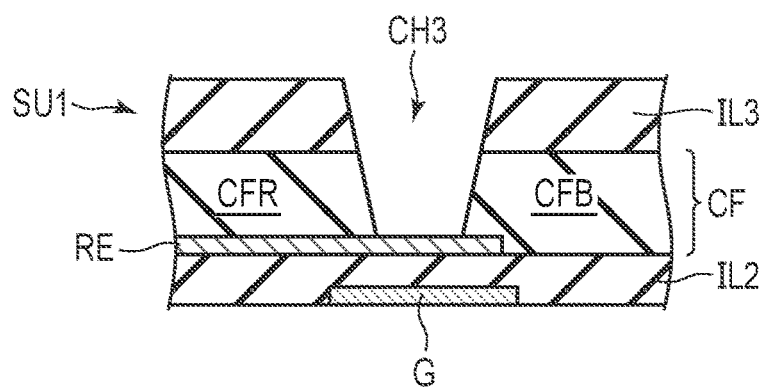
FIG. 7D is a cross-sectional view schematically showing a processing step which follows that of FIG. 7C.

Next, as shown in FIG. 7B, the third insulating layer IL3 is formed over the color filter layers CF. Further, as shown in FIG. 7C, a photoresist PR is formed to cover the third insulating layer IL3, and the photoresist PR is exposed and developed to form an opening in such a shape that corresponds to the third contact hole CH3, above the relay electrode RE and the boundary BD. In this state, dry etching is carried out to the area including the boundary BD, and then the photoresist PR is removed. Thus, the first substrate SU1 with the third contact hole CH3 is obtained as shown in FIG. 7D.

In the dry etching, the etching gas is converted into plasma, and accelerated by the electric field, and then irradiated from above the photoresist PR as indicated by the arrow in FIG. 7C. The etching gas is, for example, a fluorine gas, or preferably, a mixture of CF4 and O2. As described above, the third insulating layer IL3 and the color filter layers CF are made of a siloxane-based polymer, and therefore they are decomposed by the etching gas to be vaporized. Here, since the etching gas is accelerated by the electric field, highly anisotropic dry etching can be carried out. Thus, it is possible to reduce the diameter of the third contact hole CH3.

Note that in dry etching, pigments contained in the color filters CFR, CFG and CFB may give rise to residue. In this case, the residue may be removed by oxygen ashing or by washing with an organic solvent.

ITO, which is an example of the transparent conductive materials, is not decomposed by a mixture gas of CF4 and O2. Therefore, when the relay electrode RE is ITO, the relay electrode RE functions as a stopper for dry etching. Here, for example, the time for performing the dry etching is set slightly longer. In this manner, the third contact hole CH3 can be formed stably even if the total thickness of the color filter layer CF and the third insulating layer in the boundary BD fluctuates from the designed value.

Note that there may be such cases where misalignment occurs during the formation of the color filters CFR, CFG and CFB, and end portions of color filters of different colors overlap each other. FIGS. 8A to 8D are cross-sectional views showing processing steps for forming the third contact hole CH3 in such a situation.

Figure 8A:
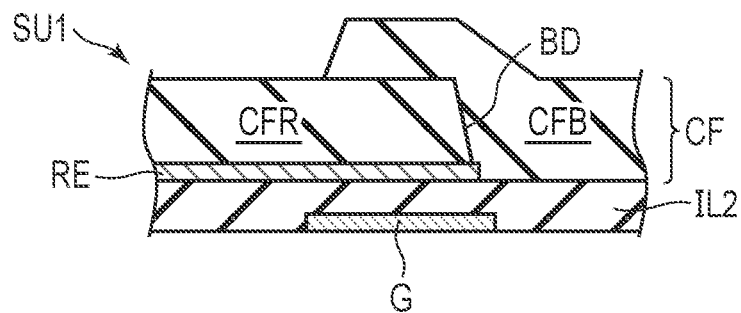
FIG. 8A is a cross-sectional view schematically showing another example of the processing step for forming the contact hole.
Figure 8B:
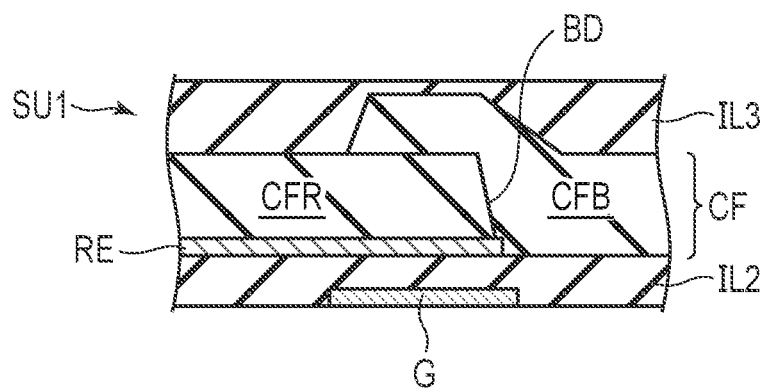
FIG. 8B is a cross-sectional view schematically showing a processing step which follows that of FIG. 8A.

In FIG. 8A, end portions of the color filter CFR and the color filter CFB overlap each other. When the third insulating layer IL3 is formed in this state, the unevenness created by the overlapping of the end portions of the color filters CFR and CFB is planarized as shown in FIG. 8B. In other words, in the vicinity of the boundary BD, the combined thickness of the color filter layer CF and the third insulating layer IL3 becomes about the same as that of the example shown in FIG. 7B.

Figure 8C:
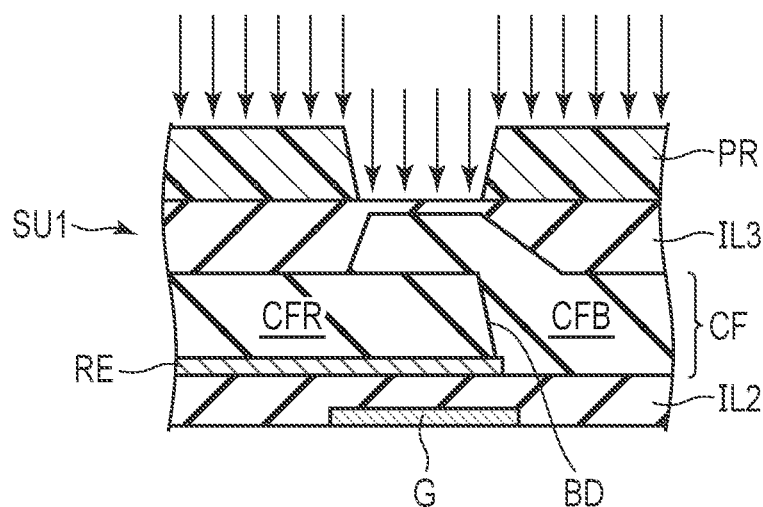
FIG. 8C is a cross-sectional view schematically showing a processing step which follows that of FIG. 8B.
Figure 8D:
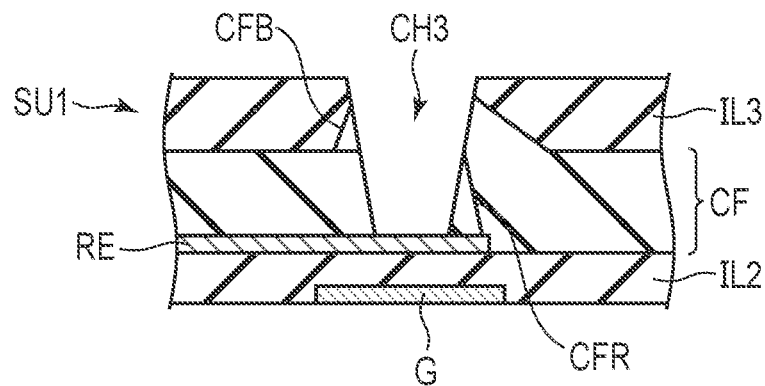
FIG. 8D is a cross-sectional view schematically showing a processing step which follows that of FIG. 8C.

After that, dry etching is carried out as shown in FIG. 8C under the same conditions as those used in the example shown in FIG. 7C. Thus, as shown in FIG. 8D, the third contact hole CH3, which penetrates to the relay electrode RE, can be obtained. If the overlap between the color filters CFR and CFB is large, the color filter CFR may surround the lower portion of the third contact hole CH3 entirely and the color filter CFB may surround the upper portion of the third contact hole CH3 entirely as shown in FIG. 8D.

Note that there may be such cases where misalignment occurs during the formation of the color filters CFR, CFG and CFB, and end portions of color filters of different colors are spaced apart from each other. FIGS. 9A to 9D are cross-sectional views showing processing steps for forming the third contact hole CH3 in such a situation.

Figure 9A:
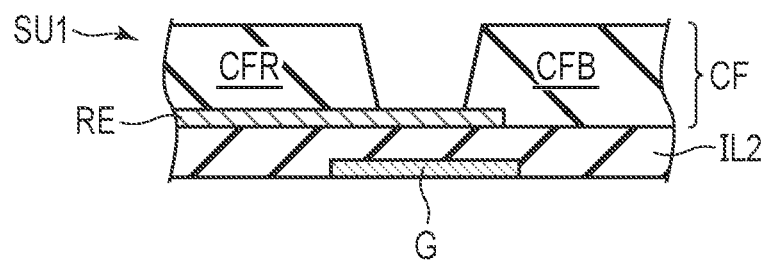
FIG. 9A is a cross-sectional view schematically showing still another example of the processing step for forming the contact hole.
Figure 9B:
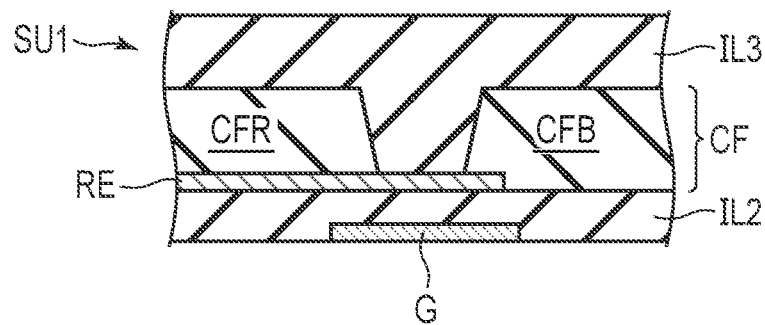
FIG. 9B is a cross-sectional view schematically showing a processing step which follows that of FIG. 9A.

In FIG. 9A, end portions of the color filter CFR and the color filter CFB are separated from each other. When the third insulating layer IL3 is formed in this state, the groove between the end portions of the color filters CFR and CFB is filled by the third insulating layer IL3 as shown in FIG. 9B. Thus, the combined thickness of the color filter layer CF and the third insulating layer IL3 in the location where the third contact hole CH3 is formed becomes about the same as that of the example shown in FIG. 7B.

Figure 9C:
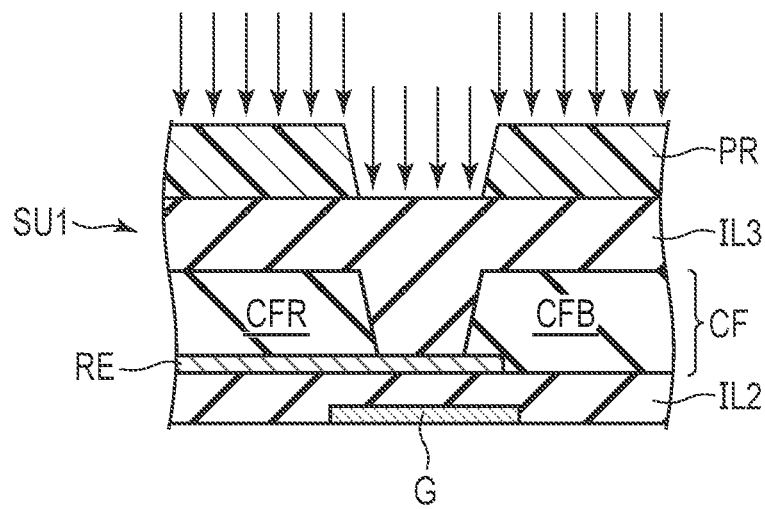
FIG. 9C is a cross-sectional view schematically showing a processing step which follows that of FIG. 9B.
Figure 9D:
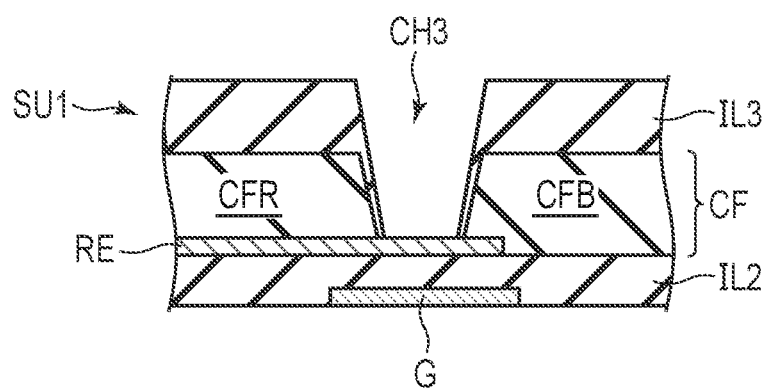
FIG. 9D is a cross-sectional view schematically showing a processing step which follows that of FIG. 9C.

Then, dry etching is carried out as shown in FIG. 9C under the same conditions as those of the example of FIG. 7C. Thus, as shown in FIG. 9D, the third contact hole CH3, which penetrates to the relay electrode RE, can be obtained. Note that if the misalignment of the color filters CFR and CFB is large, as shown in FIG. 9D, the third insulating layer IL3 may enter between the third contact hole CH3 and the color filters CFR and CFB.

In this embodiment, all of the multiple third contact holes CH3 formed in the display area DA are not necessarily formed to have the structure shown in FIG. 4 or FIG. 7D, but may include the third contact holes CH3 of the structure shown in FIG. 8D or the third contact holes CH3 of the structure shown in FIG. 9D.

Here, a comparative example with respect to this embodiment will be described. In the comparative example, it is assumed that the third contact hole CH3 is formed by wet etching.

Figure 10:
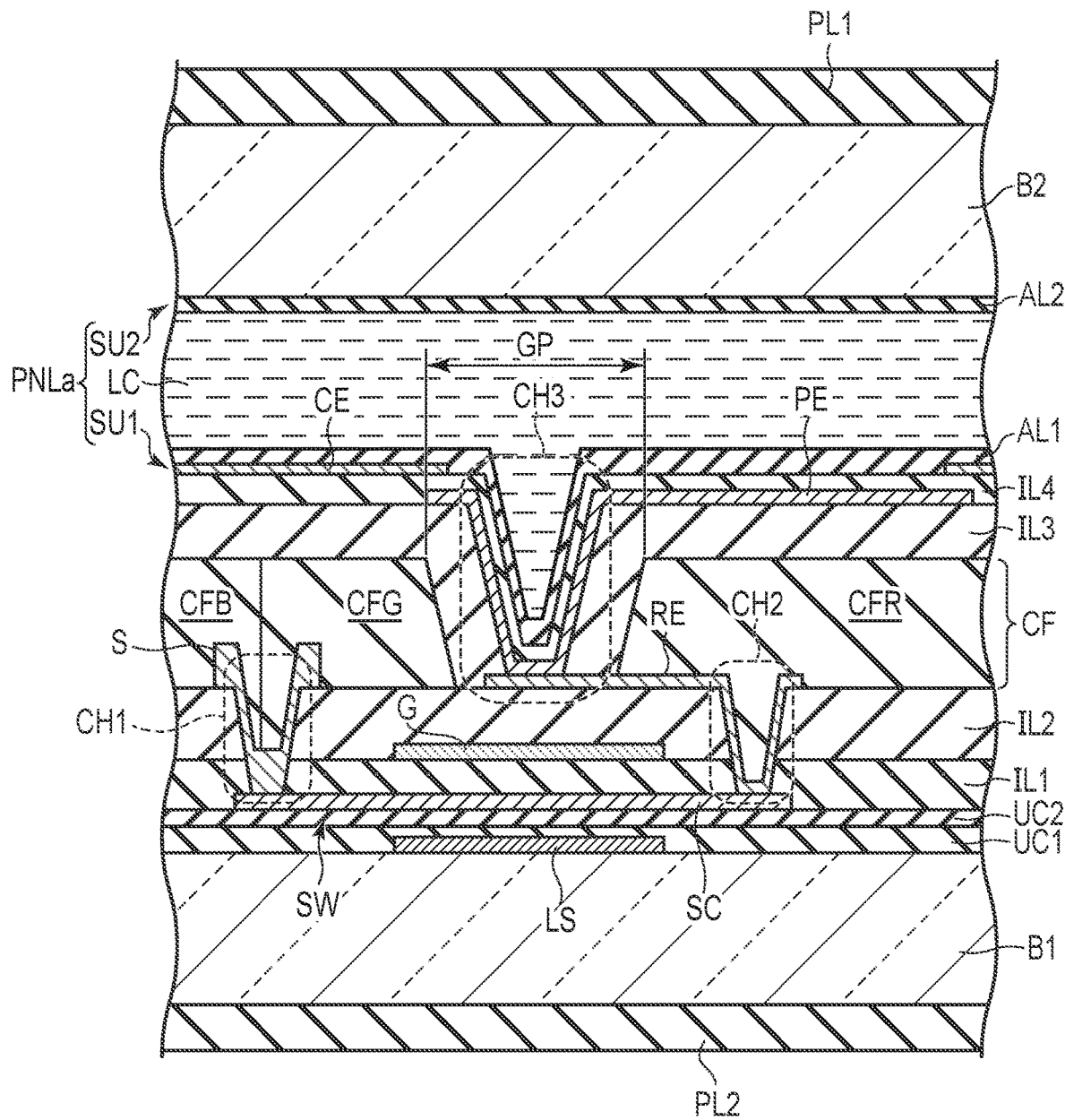
FIG. 10 is a cross-sectional view schematically showing a configuration of a display panel according to a comparative example.

FIG. 10 is a cross-sectional view showing a schematic configuration of a display panel PNLa according to the comparative example. In the display panel PNLa, a gap, which is larger than the third contact hole CH3, is formed between an end portion of the color filter CFR and an end portion of the color filter CFG. Here, each end portion of the color filters CFR and CFB is covered by the third insulating layer The end portions of the color filters CFR and CFB are covered by the third insulating layer IL3. In other words, the third contact hole CH3 in this comparative example is formed in the third insulating layer IL3. In other words, the third contact hole CH3 in this comparative example is formed in the third insulating layer IL3.

If the contact holes are formed in the color filter layers CF by wet etching, the contact holes may be formed in shapes different from each other respectively among the color filters CFR, CFG and CFB. For example, in the case of the color filter CFR, the portion etched by the wet etching is inversely tapered, which is opposite to that of the example shown in FIG. 10. Further, in the color filter CFG, the taper angle is smaller.

If the third contact holes CH3 vary from each other in shape, the display quality may as well be affected. In order to avoid this, it is necessary to form the third contact hole CH3 in the following manner. That is, when patterning the color filters CFR, CFG and CFB, such a gap GP as of this comparative example is provided, and wet etching is carried out while the gap GP is filled with the third insulating layer IL3.

However, in the wet etching, the third insulating layer IL3 is isotropically etched, and therefore the diameter of the third contact hole CH3 becomes large. If the wet etching is carried out without creating a gap GP, that is, if the wet etching is carried out in place of dry etching in the manufacturing process shown in FIG. 7A to FIG. 7D, the color filter layers CF are isotropically etched as well in addition to the third insulating layer IL3. Therefore, the diameter of the third contact hole CH3 becomes larger. If the diameter of the third contact hole CH3 becomes larger, the area to be blocked by the light-shielding layer, such as the area of the scanning lines G, becomes larger by that amount, thereby decreasing the aperture ratio.

Figure 11:
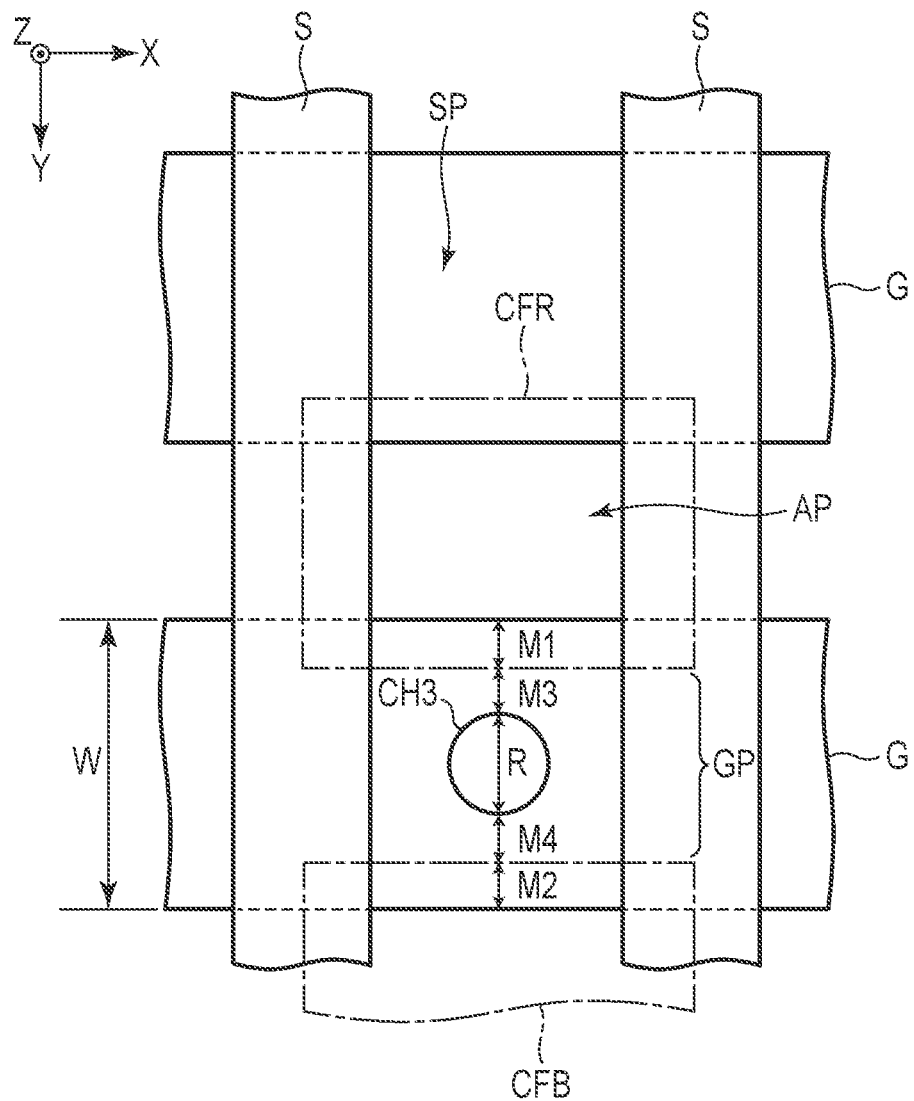
FIG. 11 is a plan view schematically showing sub-pixels of the display panel according to the comparative example.

In the structure of the display panel PNLa of the comparative example as well, the aperture ratio decreases. FIG. 11 is a plan view schematically showing a sub-pixel SP of the display panel PNLa according to the comparative example. Here, the sub-pixel SP overlaps the color filter CFR and it is assumed that the color filter CFB is located adjacent to the color filter CFR along the Y direction.

The third contact hole CH3 is located in the gap GP between the color filters CFR and CFB. If an area not overlapping the color filters CFR and CFB is created in the aperture area AP, the display color of the sub-pixel SP deviates from that of the target value. Therefore, the end portions of the color filters CFR and CFB along the Y direction need to overlap the scanning lines G with predetermined margins M1 and M2, respectively. Further, between the end portions of the color filters CFR and CFB along the Y direction and the third contact hole CH3, predetermined margins M3 and M4 are respectively required.

In the comparative example, the width W of the scanning line G along the Y direction is the sum of the margins M1 to M4 and the diameter R of the third contact hole CH3, and the scanning line G is extremely thick. As a result, the aperture area AP becomes extremely small.

If the margins M1 to M4 are 1.0 μm and the diameter R is 2.0 μm, the width W is 6.0 μm. Here, let us assume a high-definition sub-pixel having a width (Wx) along the X direction of 6.3 μm and a width (Wy) along the Y direction of 8.4 μm as described above. In this case, the width of the aperture area AP along the Y direction decreases to 2.4 μm.

Figure 12:
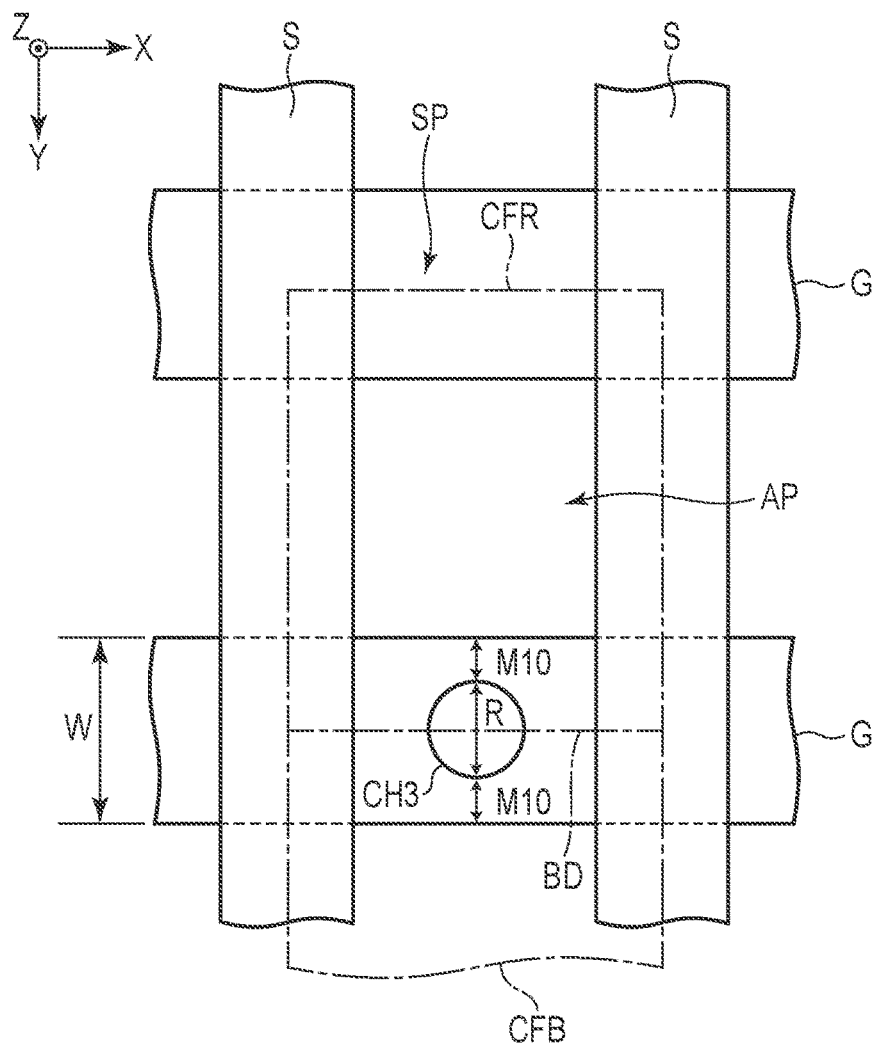
FIG. 12 is a plan view schematically showing the sub-pixels of the display panel according to the first embodiment.

FIG. 12 is a plan view schematically showing a sub-pixel SP of the display panel PNL according to the embodiment. In the embodiment, the pixel electrode PE is in contact with color filters of different colors in the third contact hole CH3 as shown in FIG. 4. With such a configuration, there is no need to provide a large gap GP as in the comparative example, and therefore the margin of overlapping between each color filter and the respective scanning line G can be easily secured.

However, in order to suppress the effect of the misalignment described above, it is preferable to secure a certain margin M10 between the third contact hole CH3 and the respective end of the scanning line G. In this case, the width W of the scanning line G is the sum of the two margins M10 and the diameter R. If the diameter R is 2.0 μm and the margin M10 is 1.0 μm as in the case of the margins M1 to M4, the width W is 4.0μm. Let us assume a high-definition sub-pixel SP having a width along the X direction (Wx) of 6.3μm and a width along the Y direction (Wy) of 8.4μm. In this case, the width of the aperture area AP along the Y direction is 4.4μm. This value is much larger than that of the comparative example shown in FIG. 11, which also significantly increases the area of the aperture area A.

Note that conventional general materials for color filters and planarization layers, such as acrylic resins, are unsuitable for anisotropic dry etching. In contrast, as described above, when the color filters CFR, CFG and CFB and the third insulating layer IL are formed of siloxane-based resin, anisotropic dry etching using a mixture gas of C4 and O2 can be used. Thus, it is possible to form the third contact hole CH3 with high accuracy.

In this embodiment, the common electrode CE is disposed between the pixel electrode PE and the liquid crystal layer LC. In this case, as compared to the configuration in which the pixel electrode PE is disposed between the common electrode CE and the liquid crystal layer LC, the distance between the pixel electrode PE and the relay electrode RE is smaller. Therefore, the size (diameter and depth) of the third contact hole CH3 can be reduced, and as a result, the area to be blocked by the light-shielding layer, such as of the scanning lines G, can also be reduced.

As described above, according to this embodiment, it is possible to obtain a display device DSP with excellent display quality by increasing the aperture ratio of the sub-pixel SP. In addition to the above, various other advantageous effects can be obtained from this embodiment.

Second Embodiment

The second embodiment will now be described. Note here that unless otherwise specifically mentioned, a configuration similar to that of the first embodiment can be applied.

Figure 13:
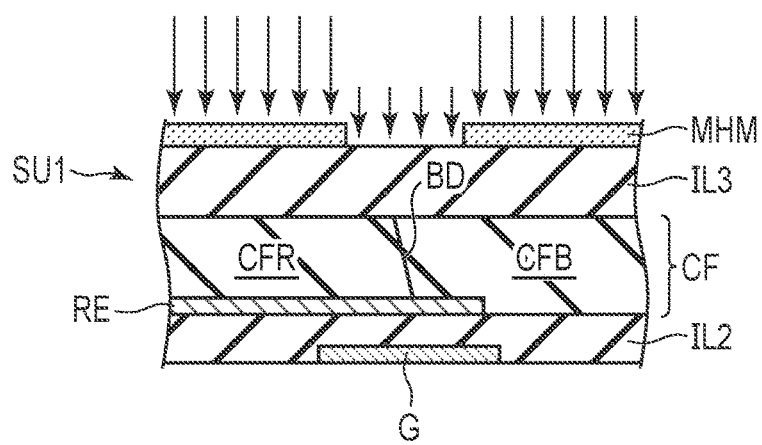
FIG. 13 is a cross-sectional view schematically showing an example of a processing step for forming a contact hole in the second embodiment.

FIG. 13 is a diagram schematically showing processing steps for forming the third contact hole CH3 in the manufacturing process of the display device DSP according to this embodiment. The first embodiment discloses an example in which dry etching is carried out using the photoresist PR as shown in FIGS. 7A to 7D. In this embodiment, dry etching is carried out using a metal mask MHM (metal hard mask) as shown in FIG. 13.

The metal mask MHM is formed on the third insulating layer IL3, and comprises an opening corresponding to the third contact hole CH3. For example, as the metal mask MHM, a molybdenum or a molybdenum alloy with a thickness of 100 nm can be used.

Even when dry etching is carried out with such a metal mask MHM formed, a third contact hole CH3 similar to that of FIG. 7D can be obtained. Further, when the metal mask MHM is used, variation in the thickness of the metal mask MHM itself during dry etching and the fluctuations resulting in pattern dimensions can be suppressed. Thus, the third contact hole CH3 can be formed with higher accuracy.

Third Embodiment

The third embodiment will now be described. Note here that unless otherwise specifically mentioned, a configuration similar to any one of those of the above-provided embodiments can be applied.

Figure 14:
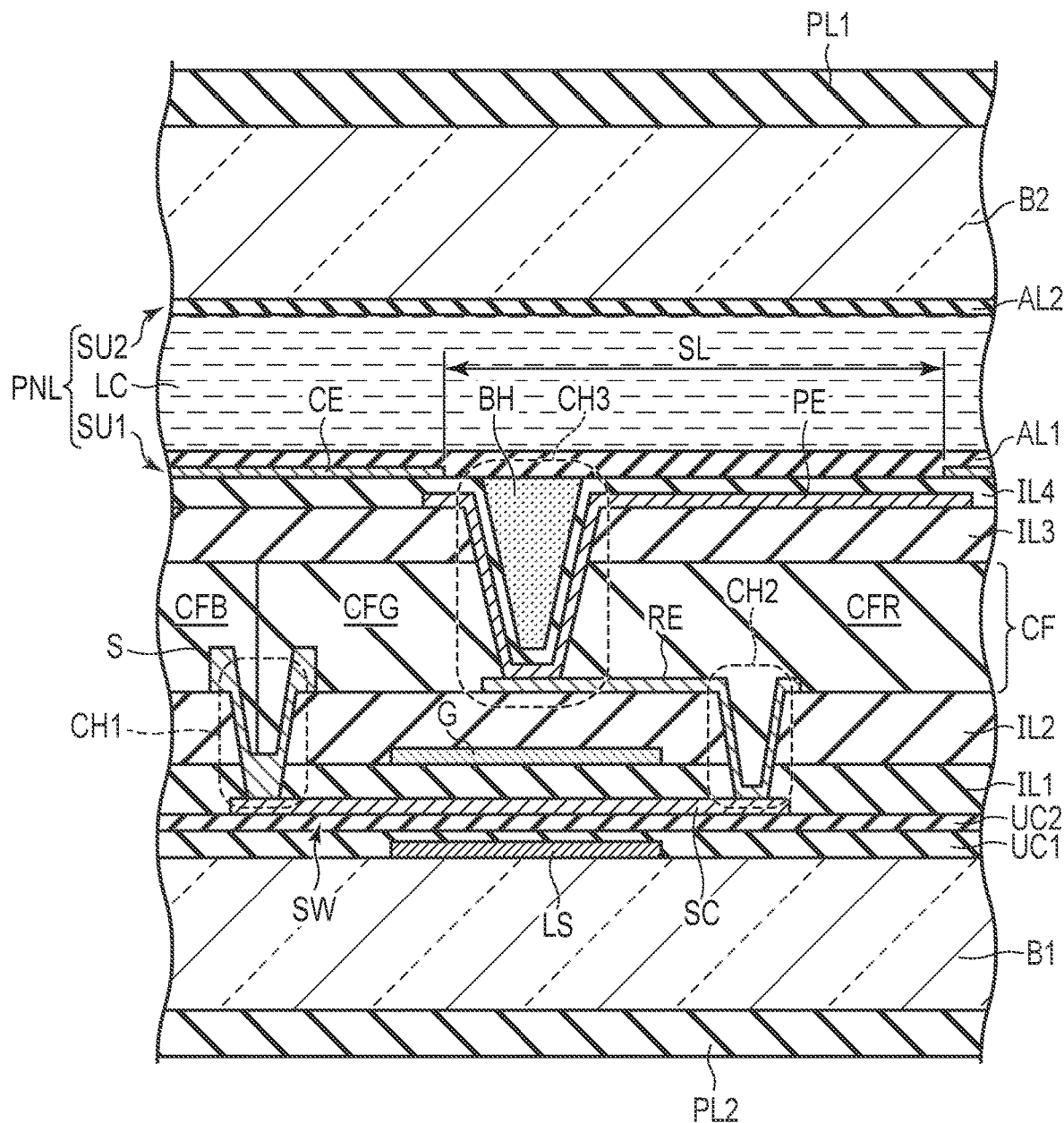
FIG. 14 is a schematic cross-sectional view of the display panel of the display device according to the third embodiment.

FIG. 14 shows a schematic cross-sectional view of a display panel PNL of a display device DSP according to this embodiment. The configuration shown in this figure is different from that of FIG. 4 in that a black layer BH (a light-shielding layer) is placed inside the third contact hole CH3.

The black layer BH is disposed between the fourth insulating layer IL4 and the first alignment film AL1. In the example of FIG. 14, the upper surface of the black layer BH is approximately aligned with the upper surface of the fourth insulating layer IL4 around the third contact hole CH3. However, the black layer BH may fill only a part of the third contact hole CH3, or it may protrude from the third contact hole CH3.

For example, a black photoresist prepared by mixing a black pigment into a positive photoresist can be used as the black layer BH. When such a black photoresist is applied to the entire fourth insulating layer IL4, the black photoresist is distributed thickly inside the third contact hole CH3 and thinly outside the third contact hole CH3. Then, the first substrate SU1 is entirely exposed and developed to remove the black photoresist from the area other than the third contact hole CH3 by the thickness of the black resist in the area other than the third contact hole CH3. Thus, the resist remains inside the third contact hole CH3. By repeating such a process several times, a black layer BH which fills the inside of the third contact hole CH3 can be obtained.

In the third contact hole CH3, the color filter layer CF is removed. Therefore, when the width of the scanning line G is reduced to achieve a high aperture ratio, color mixing caused by the third contact hole CH3 may occur.

Here, the color mixing is a phenomenon in which, when a specific color is displayed in the display area DA and the display surface is observed while changing the polar angle, the chromaticity changes asymmetrically between the positive and negative directions, meanwhile the hue changes significantly. Such color mixing occurs when light from the illumination device BL, which is tilted along the Z direction, passes through the color filter and the liquid crystal layer LC that do not correspond to each other through the portion where the color filter layer CF is removed at the boundary of the sub-pixel SP. Such color mixing is likely to occur particularly when the sub-pixel SP is of such a high-definition that the thickness of each layer of the first substrate SU1 is not negligible in relation to the width of the sub-pixel SP.

In this embodiment, the light incident on the area where the color filter layer CF is removed in the third contact hole CH3 can be shielded by the black layer BH. Thus, the above-described color mixing can be suppressed.

Further, as shown in FIG. 14, when the black layer BH fills the inside of the third contact hole CH3, the first alignment film AL1, which covers the third contact hole CH3, is planarized. As a result, the misalignment of the liquid crystal molecules in the vicinity of the third contact hole CH3 can be suppressed.

Figure 15:
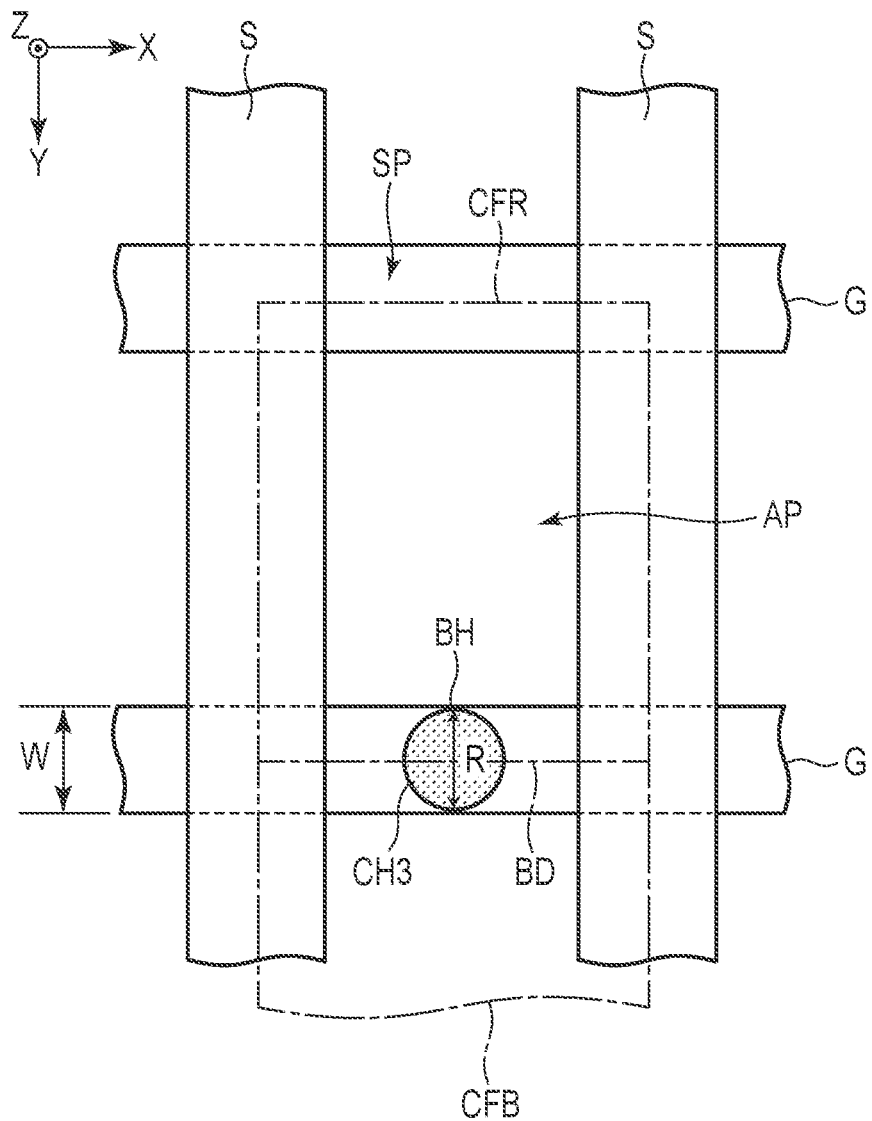
FIG. 15 is a plan view schematically showing a sub-pixel according to the third embodiment.

FIG. 15 is a plan view schematically showing the sub-pixel SP of this embodiment. If the third contact hole CH3 is filled with the black layer BH, there is no need to secure a margin M10 as in the example shown in FIG. 12. Therefore, the width W of the scanning line G can be reduced to the same level as the diameter of the third contact hole CH3.

Here, let us assume a high-definition sub-pixel SP having a width along the X direction (Wx) of 6.3 μm and a width along the Y direction (Wy) of 8.4 μm. In this case, when the diameter R of the third contact hole CH3 is 2.0 μm, and the width W of the scanning line is equal to the diameter R, the width of the aperture area AP along the Y direction is 6.4 μm. This value is larger than that of the example in FIG. 12, which also increases the area of the aperture area A.

In the first to third embodiments, the configurations in which the pixel electrode PE is connected to the relay electrode RE through the third contact hole CH3 are described as examples. However, the third contact hole CH3 can be used to connect the conductive layer other than the pixel electrodes PE placed above the color filter layer CF to some other conductive layer disposed below the color filter layers CF.

For example, in the case where a conductive layer is connected to the pixel electrode PE above the color filter layer CF, and the conductive layer is in contact with the relay electrode RE and semiconductor layer SC below the color filter layers CF, the conductive layer is brought into contact with color filters of different colors in the third contact hole CH3.

Based on the display devices and their manufacturing methods which have been described in the above-described embodiments, a person having ordinary skill in the art may achieve a display device with an arbitral design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A manufacturing method of a display device comprising:
   a switching element disposed in a display area including a pixel;
   a relay electrode connected to the switching element;
   a color filter layer covering the relay electrode and including a first color filter of a first color and a second color filter of a second color different from the first color;
   an insulating layer covering the color filter layer; and
   a conductive layer connected to the relay electrode via a contact hole penetrating the color filter layer and the insulating layer,
   wherein
   the conductive layer is in contact with the first color filter, the second color filter, and the insulating layer in the contact hole,
   the method comprising:
   preparing a first substrate including the switching element and the relay electrode;
   forming the color filter layer with siloxane resin on the relay electrode;
   forming the insulating layer on the color filter layer; and
   forming the contact hole by removing the insulating layer, the first color filter, and the second color filter in an area where a boundary with which an end portion of the first color filter and an end portion of the second color filter are in contact;
   wherein
   a mixture gas of $CF_4$ and $O_2$ is used for the dry etching; and
   the relay electrode is formed of ITO, and serves as a stopper for the dry etching.

2. The manufacturing method of claim 1, wherein:
   the first substrate comprises a scanning line that supplies a scanning signal to the switching element, and
   the contact hole is formed in a position overlapping the scanning line in planar view.

3. The manufacturing method of claim 2, wherein
   the switching element includes a semiconductor layer which intersects the scanning line, and
   the contact hole is formed in a position overlapping an area where the scanning line and the semiconductor layer intersect each other in planar view.

4. The manufacturing method of claim 2, wherein
   the boundary overlaps the scanning line in planar view.

5. The manufacturing method of claim 1, wherein the conductive layer is a pixel electrode of the pixel.

6. The manufacturing method of claim 5, wherein:
the first substrate includes a common electrode that forms an electric field with the conductive layer,
the display device further comprises:
a second substrate opposing the first substrate; and
a liquid crystal layer disposed between the first substrate and the second substrate, and
the common electrode is disposed between the conductive layer and the liquid crystal layer in a thickness direction of the first substrate.

7. The manufacturing method of claim 6, wherein the common electrode comprises a slit that overlaps the conductive layer and the contact hole in planar view.

8. The manufacturing method of claim 1, wherein:
the first substrate further comprises a light-shielding layer disposed inside the contact hole.

* * * * *